(12) United States Patent
Roh (10) Patent No.: US 8,067,112 B2
(45) Date of Patent: Nov. 29, 2011

(54) STACKED LITHIUM SECONDARY BATTERY AND ITS FABRICATION UTILIZING A FOLDED CONFIGURATION

(75) Inventor: Whanjin Roh, Seoul (KR)

(73) Assignee: Enerland Co., Ltd., Seoul (KR)

( * ) Notice: Subject to any disclaimer, the term of this patent is extended or adjusted under 35 U.S.C. 154(b) by 1212 days.

(21) Appl. No.: 10/543,352

(22) PCT Filed: Jan. 27, 2004

(86) PCT No.: PCT/KR2004/000134
§ 371 (c)(1),
(2), (4) Date: Jul. 26, 2005

(87) PCT Pub. No.: WO2004/068626
PCT Pub. Date: Aug. 12, 2004

(65) Prior Publication Data
US 2006/0088759 A1    Apr. 27, 2006

(30) Foreign Application Priority Data

Jan. 27, 2003   (KR) .................. 10-2003-0005350

(51) Int. Cl.
*H01M 6/46*   (2006.01)
*H01M 6/42*   (2006.01)
*H01M 6/00*   (2006.01)

(52) U.S. Cl. ........ 429/152; 429/160; 429/161; 29/623.1

(58) Field of Classification Search .................. 429/233, 429/231, 249, 96–100, 300–304
See application file for complete search history.

(56) References Cited

U.S. PATENT DOCUMENTS

| 5,503,948 A |   | 4/1996 | MacKay et al. | ............ 429/152 |
| 6,679,926 B1 | * | 1/2004 | Kajiura et al. | ............ 29/623.1 |
| 2003/0077508 A1 | * | 4/2003 | Asahina et al. | ............ 429/160 |

FOREIGN PATENT DOCUMENTS

| JP | 04-147574 | 5/1992 |
| JP | 2002-151156 | 5/2002 |
| WO | WO 0077866 A1 * | 12/2000 |

* cited by examiner

*Primary Examiner* — Barbara Gilliam
*Assistant Examiner* — Kwang Han
(74) *Attorney, Agent, or Firm* — Wilmer Cutler Pickering Hale and Dorr 1LP

(57) ABSTRACT

There is provided a stacked lithium secondary battery in which a plurality of cathode plates and a plurality of anode plates are alternatively facing each other, and its fabrication method. The method comprises adhering a plurality of anode plates to a portion of one surface of a separator onto which the anode plates are neighboring one another, adhering a plurality of cathode plates to a portion of the other surface of the separator onto which the cathode plates are neighboring one another, covering either the cathode or anode plates with the separator by folding the portion to which no electrode plate is adhered, successively folding the separator in a fixed one-direction along folding lines formed between the electrode plates to obtain a stacked body, and housing the obtained stacked body within a pouch, followed by injection of an electrolyte solution and packaging. The method simplifies the folding process by a fixed one-directional folding rather than a zig-zag folding, and reduces the scale of a facility required for the adhesion process by minimizing the length occupied by the electrode plates. Further, the separator can be tightly fastened such that the charge/discharge characteristics and cycle life of the battery can be enhanced, compared to a zig-zag folding.

19 Claims, 7 Drawing Sheets

PRIOR ART

STACKED LITHIUM SECONDARY BATTERY AND ITS FABRICATION UTILIZING A FOLDED CONFIGURATION

TECHNICAL FIELD OF THE INVENTION

The present invention relates to a lithium secondary battery and its fabrication, more specifically, to a stacked lithium secondary battery in which a plurality of cathode plates and a plurality of anode plates are alternatively facing each other and its fabrication.

BACKGROUND OF THE INVENTION

A battery is a device to convert chemical energy of chemicals into electrical energy through electrochemical reaction, and is classified into two categories: a primary battery and a secondary battery. Among the rechargeable secondary battery, a lithium secondary battery is the most important one, because it has the highest voltage and the largest energy density among existing batteries.

Figure 6:
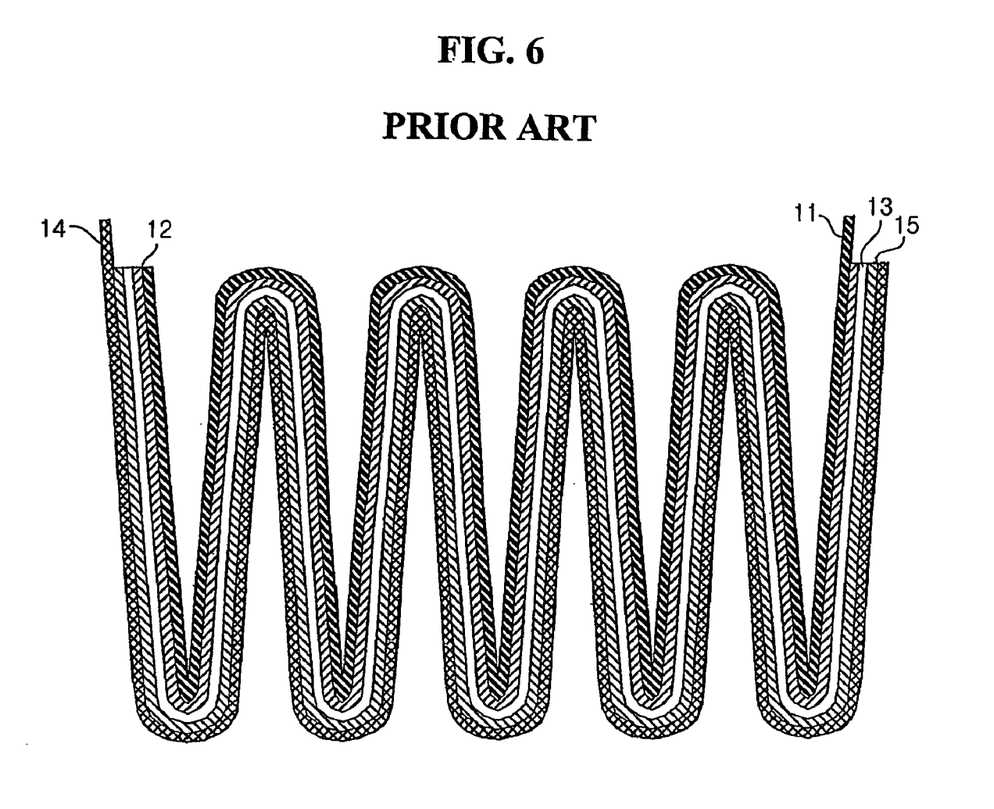
FIG. 6 is a drawing showing a conventional method for fabricating an integrated lithium secondary battery, in accordance with a prior art.

One of the conventional methods for fabricating the lithium secondary battery is described in FIG. 6. The lithium secondary battery according to the method is fabricated by successively depositing a grid-type anode current collector 11, a matrix-film type anode 12, a matrix-film type separator 13, a matrix-film type cathode 14 and a grid-type cathode current collector 15, followed by laminating the members to integrate them and folding the laminated members in a zig-zag fashion. More detailed explanation can be obtained by U.S. Pat. No. 5,460,904. The secondary lithium battery fabricated by the method ("integrated lithium secondary battery") comprises both the anode and the cathode in an integral from, and it suffers from the disadvantage that damage to the electrodes sometimes occurs in the folding process.

Figure 7:
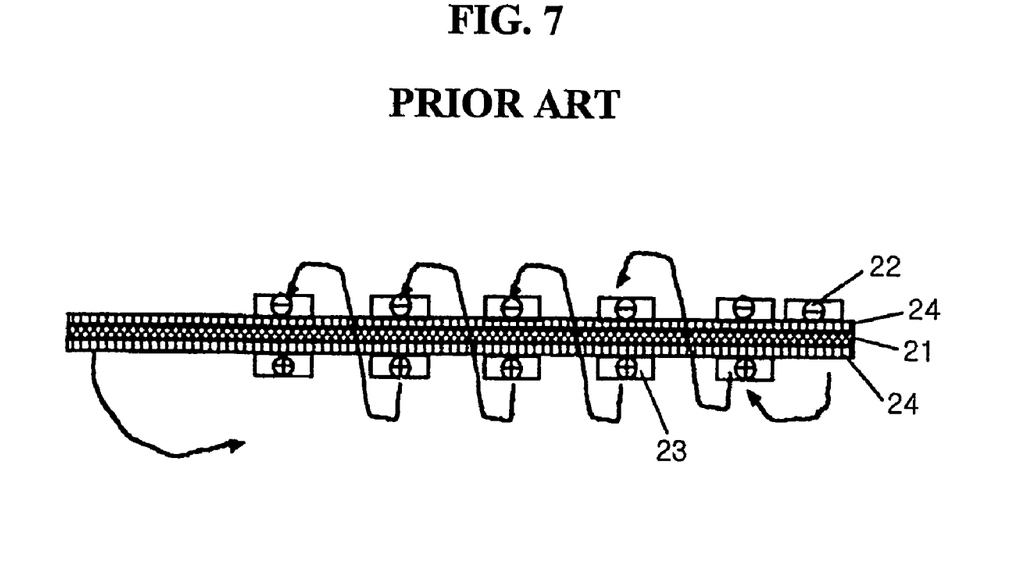
FIG. 7 is a cross sectional view showing an arrangement of a plurality of anode plates and cathode plates onto a separator, in accordance with a prior art of KR 309,604.

In order to avoid the above disadvantages, KR 309,604 and 336,396 disclose examples in which a plurality of anode plates and a plurality of cathode plates are used. FIG. 7 is a cross sectional view showing an arrangement of a plurality of anode plates and cathode plates in a separator, in accordance with the KR 309,604. The methods disclosed in KR 309,604 and 336,396 comprises adhering a plurality of anode plates 22 to one surface of the separator 21 with a predetermined interval (a distance inside which at least one electrode plate can be inserted), adhering a plurality of cathode plates 23 to the other surface of the separator 21 with a predetermined interval (a gap inside which at least one electrode plate can be inserted), and folding the separator in a zig-zag fashion to obtain a lithium secondary battery having a stacked structure in which each of the anode plates 22 and each of the cathode plates 23 are alternatively stacked. Unexplained reference numeral 24 is an adhesive layer. The stacked lithium secondary battery avoids the disadvantage of the above mentioned integrated lithium secondary battery; this method can prevent the damage to the electrode caused by a folding process. However, they are also suffered from the disadvantages that the folding process is complicated, and that it is difficult to tightly fasten the separator because folding of the separator is performed in zig-zag fashion. The gap formed between the electrodes and the separator and caused by loose fastening of the separator deteriorates cycle life of an electrochemical cell and charge/discharge characteristics. Particularly, as the surface area of the electrode is larger, the probability of the gap formation is higher, which makes it difficult to fabricate a cell having uniform electrical property. Further, as the electrode plates are adhered in a manner such that an interval within which at least one cathode or anode is inserted, the length of the separator to which the electrode plates are adhered is longer, which requires a larger facility and a larger working space.

KR published patent No. 2002-93781 by our present inventor discloses a method for fabricating a lithium secondary battery, comprising arranging both of the anode plates and the cathode plates onto one surface of the separator in a predetermined order, and then folding the separator in a fixed one-direction rather than in a zig-zag fashion. The method avoids the disadvantages caused by the zig-zag folding. However, the method suffers from a possible electrical short by neighboring arrangement of the cathode plate and the anode plate. In addition, the method also suffers from a requirement of a larger facility and a larger working space caused by larger length of the separator to which the electrode plates are adhered.

For these reasons, new stacked lithium secondary battery and its fabrication which solves the disadvantages caused by the zig-zag folding (difficulty of the folding process and reduced cycle life of the battery) and which prevent the possible electrical short are being demanded.

SUMMARY OF THE INVENTION

An object of the present invention is to provide a method for fabricating a stacked lithium secondary battery in which folding is performed in a fixed one-direction rather than in a zig-zag fashion and a possible electrical short is prevented.

Another object of the present invention is to provide a method for fabricating a stacked lithium secondary battery in which the length occupied by electrode plates is minimized such that only small-scaled facility is required for adhesion of electrode plates.

Other object of the present invention is to provide a stacked lithium secondary battery in which a possible electrical short is prevented and charge/discharge characteristics are enhanced.

BRIEF DESCRIPTION OF THE DRAWINGS

FIG. 1 is a diagram showing a preferred arrangement of the electrode plates onto a separator in accordance with the present invention, in which FIGS. 1A, 1B and 1C are a cross sectional view, a top view and a bottom view thereof, respectively.

DETAILED DESCRIPTION OF THE INVENTION

The method according to the present invention comprises: a) adhering a plurality of anode plates to a portion of one surface of a separator onto which the anode plates are neighboring one another; b) adhering a plurality of cathode plates to a portion of the other surface of the separator onto which the cathode plates are neighboring one another; c) covering either the cathode or anode plates with the separator by folding the portion to which no electrode plate is adhered; d) successively folding the separator in a fixed one-direction along folding lines formed between the electrode plates to obtain a stacked body; and e) housing the obtained stacked body within a pouch, followed by injection of an electrolyte solution and packaging.

Figure 1:
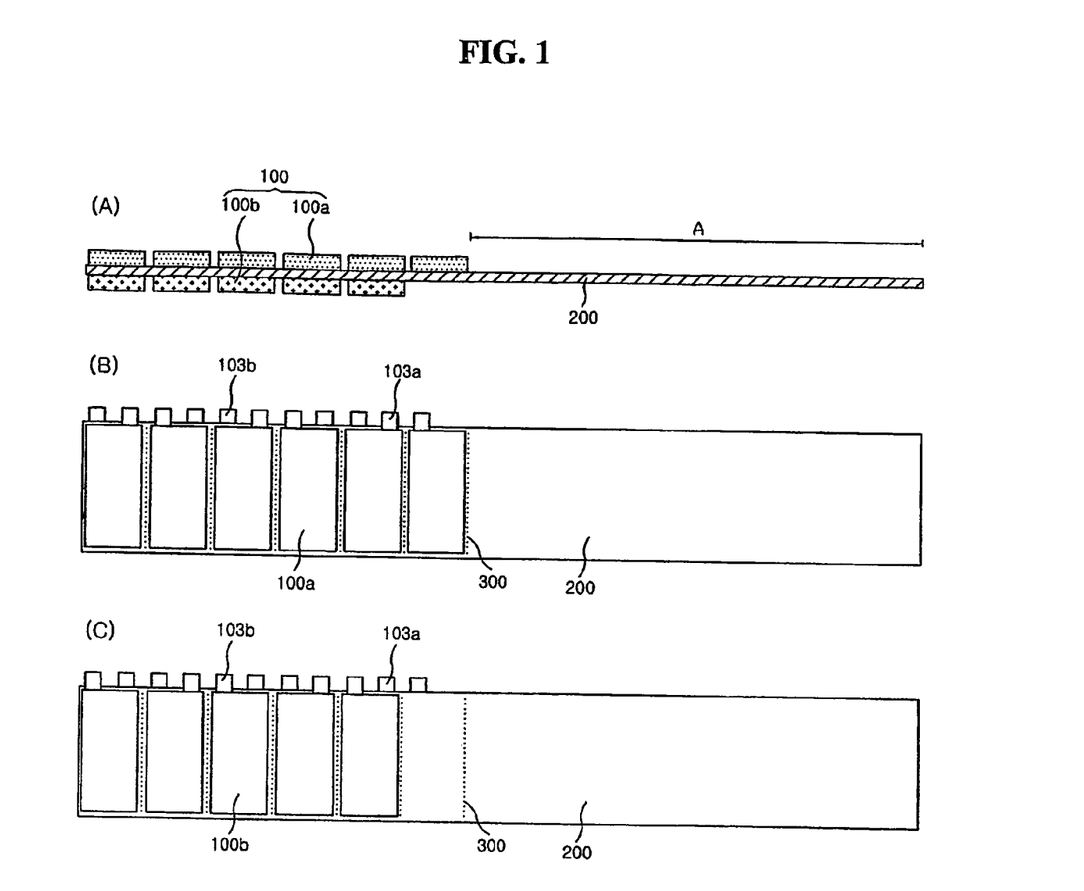
Figure 2:
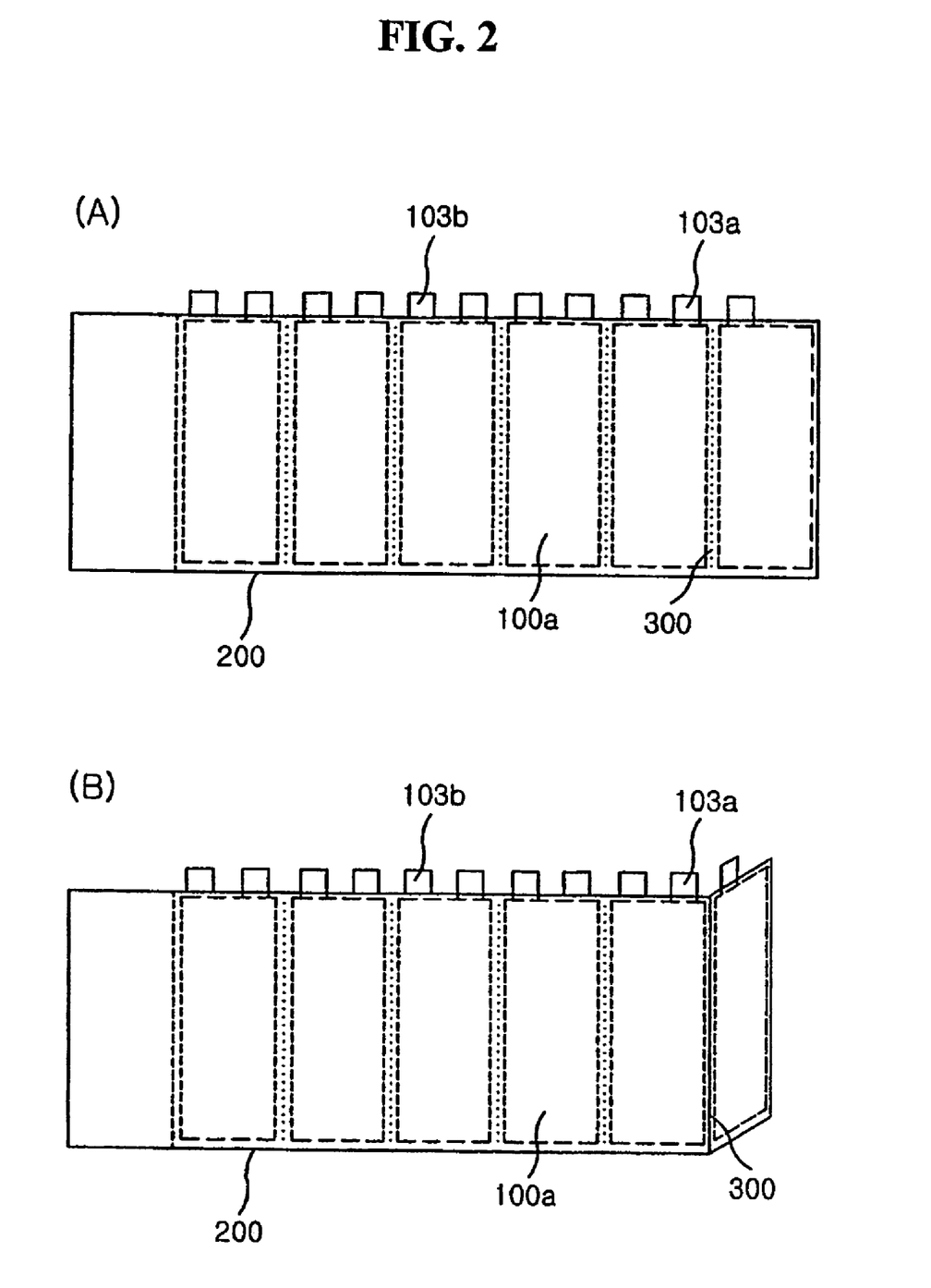
FIG. 2 is an illustrative view showing a folding process.
Figure 3:
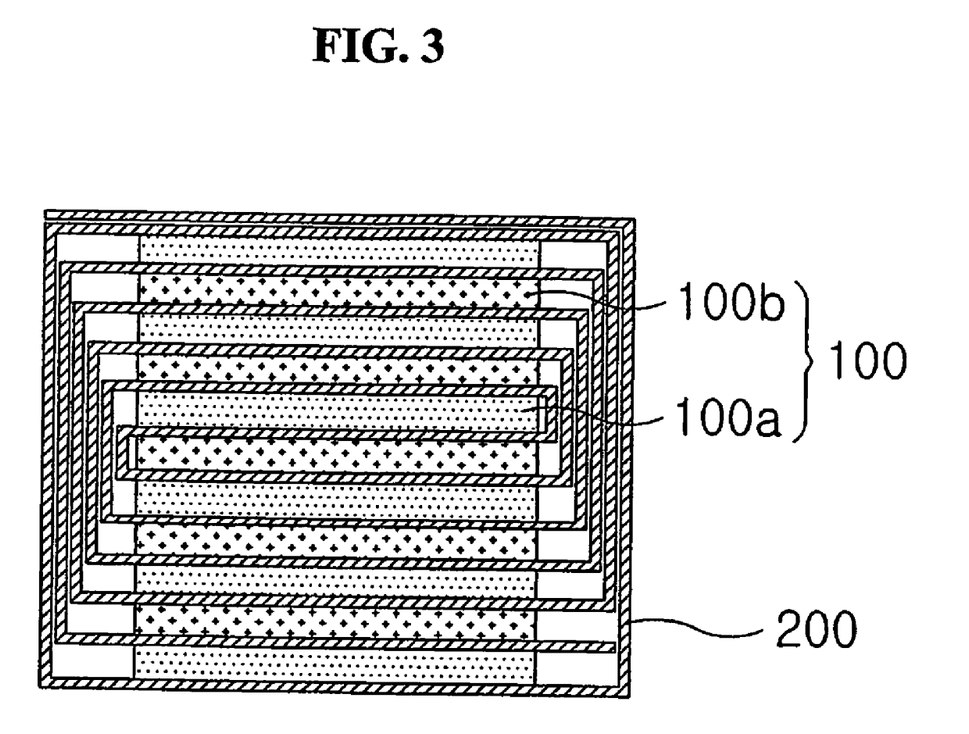
FIG. 3 is a cross-sectional view of a stacked body obtained by a successive folding shown in FIG. 2.

FIG. 1 is a drawing showing a preferred arrangement of a plurality of electrode plates onto a separator, in accordance with the present invention, in which FIGS. 1A, 1B and 1C are a cross sectional view, a top view and a bottom view thereof, respectively. FIG. 2 is an illustrative view showing a folding process and FIG. 3 is a cross-sectional view of a stacked body obtained by a successive folding.

As shown in FIGS. 1A to 1C, according to the method of the present invention, both anode plates 110a and cathode plates 100b (together, "100") which are separated by a separator (200) are adhered in a neighboring manner. As used herein, the term "neighboring" should not be understood that there is a physical contact between two adjoining plates, but it means that the two adjoining plates can be overlapped each other when one of the two plates is fold along a folding line 300 formed between the two adjoining plates. Besides neighboring arrangement, the electrode plates 100 should be arranged onto the separator 200 to satisfy the requirement that taps 103a of the anode plates 100a should overlap one another and taps 103b of the cathode plates 100b should overlap one another, when successively folded along the folding lines 300. The overlapped taps 103a and 103b are each independently connected to suitable lead lines (for example, nickel and aluminum lead lines, respectively) by an ultrasonic welding.

Adhesion of the electrode plates 100 is performed by a well-known method of the art. For example, a binder can be coated onto the separator 200 to which the electrode plates 100 will be fixed, or it can be coated onto the electrode plates 100 which will be adhered to the separator 200. As a binder to be used, an ion conductive polymer material selected from the group consisting of polypropylene oxide, polyurethane, polymethylmethacrylate, polybutylmethacrylate, polycyanoacrylate, polyethylene acrylic acid, polyacrylonitrile, polyvinylidene fluoride, polyhexapropylene fluoride, polyethylene oxide, or mixture thereof can be mentioned. The ion conductive polymer material is dissolved into a suitable solvent, and then coated on one side of the separator 200 or the electrode plates 100 by a conventional technique. As a solvent to be used, dimethyl carbonate, acetonitrile, tetrahydrofurane, acetone and methyl ethyl ketone can be mentioned.

Figure 4:
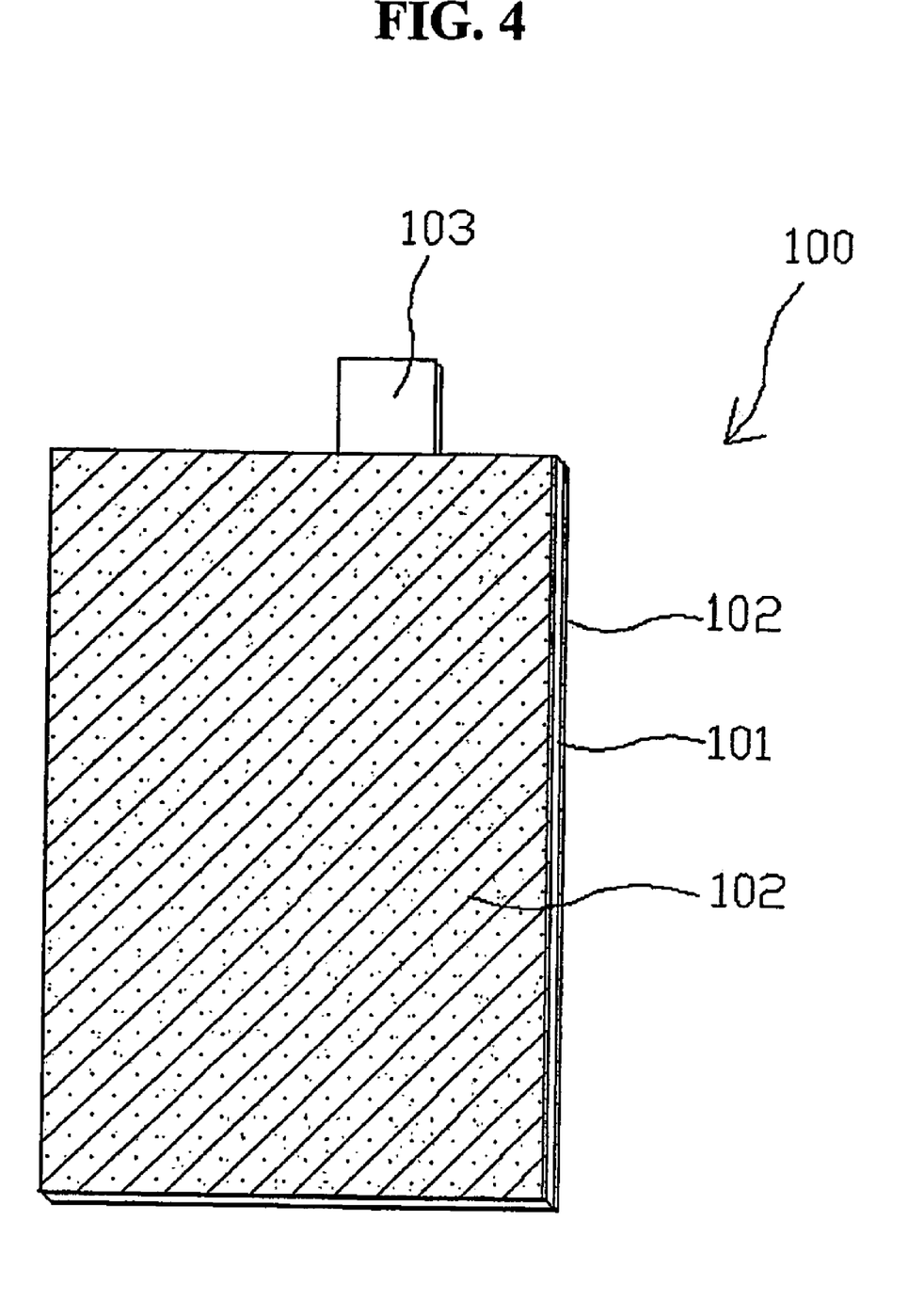
FIG. 4 is a perspective view of an electrode plate having a tap obtained by coating both surfaces of a current collector with a solution containing an electrode active material, and cutting the coated current collector in a suitable size.

FIG. 4 is a perspective view showing a preferred embodiment of an electrode plate 100 in accordance with the present invention. As shown in FIG. 4, the electrode plate 100 is prepared by coating both surfaces of a current collector 101 with a solution containing an electrode active material to form a coating layer 102 of the electrode active material, followed by cutting the coated current collector 101 in a suitable size. On condition that the electrode plate 100 has a tap 103, the electrode plate 100 may be cut into, for example, a rectangular or circular. The shape of the electrode plate 100 can be changed depending on the desired form of the final electrochemical cell. That is, the electrode plate 100 having a desired shape can be mass-manufactured by adjusting the template of a cutter or a puncher in a suitable shape. The electrode active material (a cathode active material and an anode active material) coated on the surface of the current collector 101 is not particularly limited. The material that has been used as an electrode active material in the filed of a lithium secondary battery can be widely used. Preferred cathode and anode active materials are exemplified in U.S. Pat. Nos. 5,837,015, 5,635,151 and 5,501,548. Specifically, a lithium transition metal oxide capable of intercalation/deintercalation of lithium ion, such as $LiCoO_2$, $LiMn_2O_4$, $LiNiO_2$ or $LiMnO_2$, can be mentioned as a cathode active material. As an anode active material, a material capable of intercalation/deintercalation of lithium ion, such as lithium metal, lithium alloy, carbon and graphite, can be mentioned. Preferably, the anode active material is carbon or graphite. The cathode active material has a high electrochemical potential during intercalation/deintercalation reaction, while the anode active material has a low electrochemical potential. The cathode or anode active material is dispersed into a suitable solvent, coated onto the surface of the current collector 101, and cut into a desired size to form a cathode or anode plate, respectively. The electrode active material may be coated onto one surface of the current collector 101. Preferably, it is coated on both surfaces of the current collector 101, as shown in FIG. 1. Double-sided coating provides an increased discharge capacity per unit volume. With regard to preferred examples of the current collector 101, please refer to U.S. Pat. Nos. 5,837,015, 5,635,151 and 5,501,548, which are incorporated herein by reference. According to the specific embodiment of the present invention, an aluminum thin plate and a copper thin plate were used as a cathode and anode current collector 101, respectively. Meanwhile, the electrode active material is, in general, coated on the surface of the current collector 101 in combination with a current conductive material that increases conductivity of the electrochemical cell and a binder that adheres both the electrode active material and the current conductive material to the current collector 101. The choice of the current conductive material and the binder would be readily accomplished in reference to the electrode active material, which is well known to a person of ordinary skill in the art to which the present invention pertains. If necessary, other additives (for example, an antioxidant, a flame retardant, and so on) can be optionally used.

The number of the anode plates 100a or the cathode plates 100b can be suitably selected, regarding the anode active material to be used, the cathode active material to be used, the electrolyte to be used, and the desired discharge capacity of the battery. Generally, the number of the anode plates 100a used is more than that of the cathode plates 100b by 1. When the number of the anode plates (or the cathode plates) is more than 100, the folding process may be complicated. Therefore, the anode plates are used in a range of 2-100. Preferably, 3-50, more preferably, 3-20, most preferably 4-15 anode plates are used.

After the electrode plates 100 being adhered onto the separator 200, the portion A to which no electrode plate is adhered is folded along a folding line 300 and covers the electrodes 100, specifically anode plates 100a (please refer to FIG. 2A). And then, successive folding along the folding lines 300 as shown in FIG. 2B produces a stacked body in which each of the anode plates 100a and each of the cathode plates 100b are alternating each other and separated by the separator 200. FIG. 3 is a cross sectional view of the stacked body obtained by the folding process.

As shown in FIG. 3, the stacked body comprises a plurality of the anode plates 100a and the cathode plates 100b which are facing each other and separated by the separator 200. The anode plates 100a and the cathode plates 100b are completely separated by the separator 200 so that the danger of an electrical short is completely removed. At this time, the separator 200 is successively folded in a fixed one-direction along the folding lines 300, yielding a configuration in which connected double-layered film is successively folded in a fixed one-direction from an inner side to an outer side. Specifically, the separator 200 does not have a configuration in which a single-layered film is successively folded in a fixed one-direction from an inner side to an outer side which is generally shown in the conventional stacked battery, but has the configuration in which connected double-layered film is successively folded in a fixed one direction from an inner side to an outer side, and into spaces formed between the double-layered film, the anode plates 100a and the cathode plates 100b are alternatively positioned. The configuration of the separator is illustrated in FIG. 4 and includes a double-layered film successively folded in a fixed one-direction from an inner side to an outer side. In this configuration, the separator prevents a direct electrical contact of the anode plate 100a with the cathode plate 100b and provides pores for ion passage. Preferred examples are porous polyolefin films such as a polyethylene film or a polypropylene film, porous polyvinylidene fluoride films, porous hexapropylene fluoride films and porous polyethylene oxide films, but are not limited thereto. The polyethylene film is being widely used as a separator 200 in the art. The separator 200 may be comprised of two or more porous films.

Generally, a final battery is produced by housing the stacked body into a pouch of the package, followed by injection of the electrolyte solution and heat-sealing of the package under vacuum. At this time, iron or aluminum is in general used as a packaging material. As an electrolyte, liquid electrolyte, gel electrolyte or solid electrolyte can be used. According to the preferred embodiment of the present invention, a liquid electrolyte solution, prepared by dissolving lithium salts such as $LiCF_3SO_3$, $Li(CF_3SO_2)_2$, $LiPF_6$, $LiBF_4$, $LiClO_4$ or $LiN(SO_2C_2F_5)_2$ into a polar organic solvent such as ethylene carbonate, propylene carbonate, dimethyl carbonate, diethyl carbonate and methyl ethyl carbonate, was used.

The steps of the method according to the present invention can be continuously performed to produce a lithium secondary battery in a large scale. For example, the steps a) to e) can be continuously performed after a rolled separator has been rolled out in a suitable speed. In doing so, the separator 200 onto which the electrode plates 100 are arranged is folded in a fixed one-direction rather than in a zig-zag fashion such that tight fastening of the separator can be accomplished. Further, the total number of the folding is reduced as much as ½, compared with the conventional methods, which enhances the performance of the process.

The present invention also relates to a stacked lithium secondary battery fabricated by the above method in which a plurality of anode plates and a plurality of cathode plates separated by a separator are facing each other. More specifically, the present invention relates to a stacked lithium secondary battery comprising a plurality of anode plates, a plurality of cathode plates, a separator separating the anode plates and the cathode plates and an electrolyte, wherein the separator has a configuration in which a connected double-layered film is successively folded in a fixed one-direction from an inner side to an outer side, the anode plates and the cathode plates are alternatively positioned into spaces formed between the double-layered film. The stacked lithium secondary battery in accordance with the present invention has a structure such that a plurality of the anode plates and the cathode plates are facing each other, taps of the anode plates and taps of the cathode plates each independently are overlapping one another, the separator has a configuration in which a connected double-layered film is successively folded in a fixed one-direction from an inner side to an outer side, and the electrolyte is charged between the cathode plate and the separator and between the anode plate and the separator. The stacked lithium secondary battery having such a structure avoids the danger of an electrical short caused by an undesired contact of the cathode plate with the anode plate. Further, because the stacked lithium secondary battery is obtained by a fixed one-directional folding, charge/discharge characteristics are enhanced. Specifically, compared to the lithium secondary battery obtained by a zig-zag folding disclosed in KR 309,604 and 336,396, the lithium secondary battery obtained by a fixed one-directional folding enables to tightly fasten the separator, to enhance charge/discharge characteristics, and to extend the cycle life of the battery.

In the following, the present invention will be more fully described referring to specific Examples. However, it should be understood that the Examples are suggested only for illustration and should not be construed to limit the present invention. Numerous modifications could be made without departing from the scope and the spirit of the invention.

EXAMPLES

Example 1

Preparation of an Electrode Plate

A cathode plate was prepared by the conventional process: a mixture of 100 g of $LiCoO_2$ powder as a cathode active material, 5 g of carbon black as a current conductive material and 5 g of polyvinylidene fluoride as a binder was homogeneously mixed, and then 100 ml of N-methylpyrrolidone was added to the mixture. The obtained solution was coated onto both sides of a aluminum foil having a thickness of 15 μm which serves as a current collector, dried and then pressed with a roll presser. The thickness of the cathode plate was 150 μm.

Likewise, an anode plate was prepared: 100 g of graphite powder and 10 g of polyvinylidene fluoride as binder was homogeneously mixed, and then 100 ml of N-methylpyrrolidone was added to the mixture. The obtained solution was coated onto both sides of a copper foil having a thickness of 15 μm which serves as an anode collector, dried and then pressed with a roll presser. The thickness of the cathode plate was 150 μm.

The cathode and anode plates were cut with a puncher such that the cathode and anode plates as shown in FIG. 4 in which each of the cathode and anode plates having a dimension of 3 cm×4 cm has a tap having a dimension of 0.5 cm×0.5 cm were obtained. The cathode plates and the anode plates obtained were stored into a cassette.

Example 2

Preparation of a Battery

A polymer solution was prepared be mixing acetonitrile (available from Aldrich) and polyethylene oxide (available from Aldrich, average molecular weight 1,000,000) at a ratio of 100:3 by weight. The obtained polymer solution was coated onto both sides of a porous polyethylene sheet (Tecklon™ manufactured by ENTEK, thickness: 25 μm) which serves as a separator with a liquid constant delivery apparatus in a thickness of 2 μm.

The anode plates and the cathode plates from the cassette were adhered in an order as shown in FIG. 1. After that, successively folding in a fixed one-direction along the folding line gave a stacked body as shown in FIG. 3. The projected taps of the cathode plates and the anode plates were led out by nickel and aluminum leads and welded in parallel with an ultrasonic wave, each independently. The stacked body was housed within an aluminum laminating sheet having a pouch to house the stacked body, and an electrolyte solution prepared by dissolving by 1.2 mol of $LiPF_6$ into 3 ml of a mixed solvent of ethylene carbonate and ethylmethyl carbonate (1:1, by volume) was injected into the pouch. Heat-sealing of the pouch under vacuum produced a stacked lithium secondary battery having a thickness of 3.8 mm, width of 35 mm and length of 62 mm.

Comparative Example 1

A stacked lithium secondary battery was obtained in the same manner as described in Example 2 except that an interval (3.3 cm) was formed between the two anode plates as well as between the two cathode plates and that the separator was successively folded in a zig-zag fashion as shown in FIG. 7.

In the following table 1, the results of Example 2 and Comparative Example 1 are summarized:

TABLE 1

|  | Example 2 | Comparative Example 1 |
| --- | --- | --- |
| The number of folding of electrode plates | 6 times | 11 times |
| Time required for an adhesion process | 4 sec | 10 sec |
| The length of a facility required for an adhesion process of electrode plates | 20 cm | 40 cm |
| Folding technique | Fixed one-direction | Zig-zag |

Test of Cycle Life of Batteries

Figure 5:
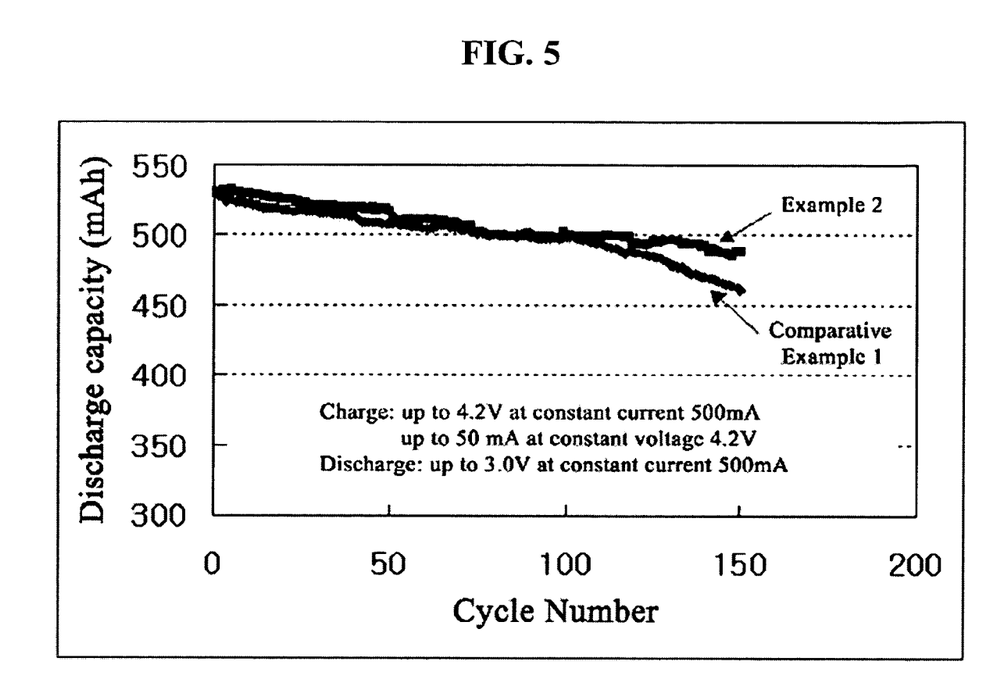
FIG. 5 is a characteristic graph showing cycle life of the battery of Example 2.

Cycle life of the battery of Example 2 was tested and compared with that of Comparative Example 1. The results thereof are shown in FIG. 5. As shown in FIG. 5, the lithium secondary battery of the present invention retained 92% or more discharge capacity after more than 150 cycles, while the battery of Comparative Example 1 had a discharge capacity of less than 88% and the tendency of reduction was increasingly high.

As described above, the method according to the present invention provides the following benefits: firstly, there is no danger of an electrical short caused by an undesired contact of a cathode plate with an anode plate, because the cathode and anode plates are definitely separated by a separator. And, because folding is performed in a fixed one-direction rather than in a zig-zag fashion, the disadvantages caused by a zig-zag folding can be avoid, for example inconvenience of the process, difficulty for tight fastening of a separator which results a gap between the electrode plate and a separator and reduces the cycle life of the battery. Besides the above advantages, the method reduces the scale of an facility required for adhering electrode plates and enables to efficiently utilize a working space, because the anode plates as well as the cathode plates are neighboring one another such that the portion to which the electrode plates are adhered can be reduced as much as ½ compared with KR 309.604, KR 336,396 and KR published patent 2002-93781. Further, the number of folding is reduce as much as ½ compared with KR 309.604, KR 336,396 and KR published patent 2002-93781, which increase the efficiency of the process. In addition, the lithium secondary battery fabricated by the method according to the present invention has highly enhanced charge/discharge characteristics because of stable interface by tight fastening of the separator sandwiched between the anode plate and cathode plate during successive folding. Further, the battery avoids danger of an electrical short, because the anode plate and the cathode plate are completely separated by a separator.

The invention claimed is:

1. A method for fabricating a stacked lithium secondary battery, comprising:
   a) adhering a plurality of anode plates to a portion of one surface of a separator onto which the anode plates are neighboring one another, wherein the anode plates respectively comprise a current collector having a coating of electroactive anode material, each of the plurality of anode plates having a separate protrusion that forms a tap;
   b) adhering a plurality of cathode plates to a portion of the other surface of the separator onto which the cathode plates are neighboring one another, wherein the cathode plates respectively comprise a current collector having a coating of electroactive cathode materials, each of the plurality of cathode plates having a separate protrusion that forms a tap;
   c) covering either the cathode or anode plates with the separator by folding a portion to which no electrode plate is adhered;
   d) successively folding the separator in a fixed one-direction along folding lines formed between the electrode plates to obtain a stacked body, such that the taps of anode plates overlap one another and the taps of the cathode plates overlap one another; and
   e) housing the obtained stacked body within a pouch, followed by injection of an electrolyte solution and packaging.

2. The method according to claim 1, wherein the cathode or anode plates are members in which the electroactive cathode or anode active material is coated onto both sides of the current collectors.

3. The method according to claim 2, wherein the cathode active material is a lithium transition metal oxide.

4. The method according to claim 2, wherein the anode active material metallic lithium, lithium alloy, carbon or graphite.

5. The method according to claim 1, wherein the separator is selected from the group consisting of a polyethylene film, a polypropylene film, a polyvinylidene fluoride film, a hexapropylene fluoride film, a polyethylene oxide film and a combination thereof.

6. The method according to claim 1, wherein the electrolyte is liquid electrolyte, gel electrolyte or solid electrolyte.

7. The method according to claim 1, comprising connecting the overlapped taps of the anode plates to a lead line, such that the taps of the anode plates are each independently connected to the lead line.

8. The method according to claim 1, comprising connecting the overlapped taps of the cathode plates to a lead line, such that the taps of the cathode plates are each independently connected to the lead line.

9. The method according to claim 8, comprising connecting the overlapped taps of the anode plates to a separate lead line, such that the taps of the anode plates are each independently connected to the separate lead line.

10. The method according to claim 1, wherein each anode plate has a first side adhered to the separator and a second opposing side facing away from the separator, such that the second side of the anode plate is contacted by the separator during said covering.

11. The method according to claim 1, wherein each cathode plate has a first side adhered to the separator and a second opposing side facing away from the separator, such that the second side of the cathode plate is contacted by the separator during said covering.

12. The method according to claim 1, wherein before said successively folding the separator, configuring the taps of the anode plates to be offset from a center of the anode plates in a first direction and configuring the taps of the cathode plates to be offset from a center of the cathode plates in a second direction that is opposite the first direction.

13. The method according to claim 1, wherein before said successively folding the separator, the current collectors of the anode plates are separated from each other in a longitudinal direction of the separator.

14. The method according to claim 13, wherein before said successively folding the separator, the current collectors of the cathode plates are separated from each other in a longitudinal direction of the separator.

15. The method according to claim 1, wherein the anode plates are formed by coating a surface of the anode current collectors with the electroactive anode material and performing a cutting operation to provide anode plates having a desired size.

16. The method according to claim 1, wherein the cathode plates are formed by coating a surface of the cathode current collectors with the electroactive cathode material and performing a cutting operation to provide cathode plates having a desired size.

17. The method according to claim 1, wherein the anode current collectors are arranged such that they do not extend beyond circumferences of the anode electroactive material, except where the taps for the anode plates are formed.

18. The method according to claim 1, wherein the cathode current collectors are arranged such that they do not extend beyond circumferences of the cathode electroactive material, except where the taps for the cathode plates are formed.

19. A stacked lithium secondary battery comprising a plurality of anode plates, wherein the anode plates respectively comprise a current collector having a coating of electroactive anode material, each of the plurality of anode plates having a separate protrusion that forms a tap, a plurality of cathode plates, wherein the cathode plates respectively comprise a current collector having a coating of electroactive anode material, each of the plurality of cathode plates having a separate protrusion that forms a tap, a separator separating the anode plates and the cathode plates and an electrolyte, wherein the separator has a configuration in which a connected double-layered film is successively folded in a fixed one-direction from an inner side to an outer side, the anode plates and the cathode plates are alternatively positioned into spaces formed between the double-layered film, taps of the anode plates are overlapping one another, and taps of the cathode plates are overlapping one another.

* * * * *